(12) United States Patent
Srivastava et al.

(10) Patent No.: US 11,915,121 B2
(45) Date of Patent: Feb. 27, 2024

(54) SIMULATOR-ASSISTED TRAINING FOR INTERPRETABLE GENERATIVE MODELS

(71) Applicant: International Business Machines Corporation, Armonk, NY (US)

(72) Inventors: Akash Srivastava, Boston, MA (US); Jessie Carrigan Rosenberg, Cambridge, MA (US); Dan Gutfreund, Newton, MA (US); David Cox, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 16/672,996

(22) Filed: Nov. 4, 2019

(65) Prior Publication Data

US 2021/0133539 A1 May 6, 2021

(51) Int. Cl.
*G06N 3/045* (2023.01)
*G06N 3/047* (2023.01)
(Continued)

(52) U.S. Cl.
CPC ............. *G06N 3/045* (2023.01); *G06N 3/047* (2023.01); *G06N 3/08* (2013.01); *G06N 5/04* (2013.01)

(58) Field of Classification Search
CPC ...... G06N 3/0454; G06N 3/0472; G06N 3/08; G06N 5/04; G06N 5/045; G06N 3/045; G06N 3/047
See application file for complete search history.

(56) References Cited

U.S. PATENT DOCUMENTS

| 10,311,334 B1 | 6/2019 | Florez Choque et al. |
| 2018/0101784 A1 | 4/2018 | Rolfe et al. |

(Continued)

FOREIGN PATENT DOCUMENTS

| AU | 2018101528 A4 | 11/2018 |
| CN | 108647226 A | 10/2018 |

(Continued)

OTHER PUBLICATIONS

Krajewski, Robert, et al. "Data-driven maneuver modeling using generative adversarial networks and variational autoencoders for safety validation of highly automated vehicles." 2018 21st International Conference on Intelligent Transportation Systems (ITSC). IEEE, 2018. (Year: 2018).*

(Continued)

*Primary Examiner* — Ying Yu Chen
(74) *Attorney, Agent, or Firm* — Scully, Scott, Murphy & Presser, P.C.; Caleb Wilkes (57) ABSTRACT

A generator network of a variational autoencoder can be trained to approximate a simulator and generate a first result. The simulator is associated with input data, based on which the simulator outputs output data. A training data set for the generator network can include the simulator's input data and output data. Based on the simulator's output data and the first result of the generator network, an inference network of the variational autoencoder can be trained to generate a second result. The second result of the trained inference network inverts the first result of the generator and approximates the simulator's input data. The trained inference network can function as an inverted simulator.

20 Claims, 8 Drawing Sheets

(51) Int. Cl.
  *G06N 3/08* (2023.01)
  *G06N 5/04* (2023.01)

(56) References Cited

U.S. PATENT DOCUMENTS

| | | | |
|---|---|---|---|
| 2019/0026631 A1 | 1/2019 | Carr et al. | |
| 2020/0090049 A1* | 3/2020 | Aliper | G06V 20/69 |
| 2021/0073584 A1* | 3/2021 | St. Romain, II | G06N 5/04 |

FOREIGN PATENT DOCUMENTS

| | | |
|---|---|---|
| KR | 101843074 B1 | 3/2018 |
| WO | 2019118644 A1 | 6/2019 |

OTHER PUBLICATIONS

Korthals, T., Hesse, M., Leitner, J., Melnik, A., & Ruckert, U. (Jul. 2019). Jointly trained variational autoencoder for multi-modal sensor fusion. In 2019 22th International Conference on Information Fusion (FUSION) (pp. 1-8). IEEE. (Year: 2019).*
Tran, D., Ranganath, R., & Blei, D. (2017). Hierarchical implicit models and likelihood-free variational inference. Advances in Neural Information Processing Systems, 30. (Year: 2017).*
Burgess, C. P., Higgins, I., Pal, A., Matthey, L., Watters, N., Desjardins, G., & Lerchner, A. (2018). Understanding disentangling in $ \beta $-VAE. arXiv preprint arXiv:1804.03599. (Year: 2018).*
Ma, W., Cheng, F., Xu, Y., Wen, Q., & Liu, Y. (2019). Probabilistic representation and inverse design of metamaterials based on a deep generative model with semi-supervised learning strategy. Advanced Materials, 31(35), 1901111. (Year: 2019).*
Zhu, S., Surovik, D., Bekris, K., & Boularias, A. (Oct. 2018). Efficient model identification for tensegrity locomotion. In 2018 IEEE/RSJ International Conference on Intelligent Robots and Systems (IROS) (pp. 2985-2990). IEEE. (Year: 2018).*
Zhang, C., & Peng, Y. (Sep. 2018). Stacking VAE and GAN for context-aware text-to-image generation. In 2018 IEEE Fourth International Conference on Multimedia Big Data (BigMM) (pp. 1-5). IEEE. (Year: 2018).*
Aunter, J.D., "Matplotlib: A 2D Graphics Environment", Computing in Science & Engineering, May/Jun. 2007, pp. 90-95.
Chen, X., et al., "Isolating sources of disentanglement in VAEs", CoRR, http://arxiv.org/abs/1802.04942, Apr. 23, 2019, 29 pages.
Chen, X., et al., "InfoGAN: Interpretable Representation Learning by Information Maximizing Generative Adversarial Nets", 30th Conference on Neural Information Processing Systems, (NIPS 2016), 9 pages.
Goodfellow, I.J., "Generative Adversarial Nets", In Advances in neural information processing systems, 9 pages.
Gretton. A., et al., "A Kernel Two-Sample Test", Journal of Machine Learning Research, Submitted 4/08, Revised 11/11, Published 3/12, pp. 723-775.
Higgins, I., er al., "beta-VAE: Learning Basic Visual Concepts with a Constrained Variational Framework", In International Conference on Learning Representations, 2017, 13 pages, vol. 3.
Wu, J., et al., "Neural Scene De-rendering", In Computer Vision and Pattern Recognition (CVPR), Jul. 2017, 9 pages.
Wu, J., et al., "Learning to See Physics via Visual De-animation", 31st Conference on Neural Information Processing Systems (NIPS 2017), Dec. 2017, 12 pages.
Kingma, D.P., et al., "Adam: A Method for Stochastic Optimization", Published as a conference paper at ICLR 2015, https://arxiv.org/pdf/1412.6980.pdf, Submitted on Dec. 22, 2014 (v1), last revised Jan. 30, 2017 (v9), 15 pages.
Kingma, D.P., et al., "Auto-Encoding Variational Bayes", https://arxiv.org/pdf/1312.6114.pdf, May 1, 2014, 14 pages.
Kulkarni, T.D., et al., "Deep Convolutional Inverse Graphics Network", Advances in Neural Information Processing Systems 28 (NIPS 2015), Mar. 2015, 9 pages.
Kullback, S., et al., "On Information and Sufficiency", The Annals of Mathematical Statistics, Mar. 1951, pp. 79-86, vol. 22, No. 1.
Lake, B.M., et al., "Human-level concept learning through probabilistic program induction", Science, Dec. 11, 2015, pp. 1332-1338, vol. 350, Issue 6266.
Lake, B.M., et al., "Building Machines that Learn and Think Like People", In press at Behavioral and Brain Sciences, https://arxiv.org/pdf/1604.00289.pdf, Submitted on Apr. 1, 2016 (v1), Last revised Nov. 2, 2016 (v3), 58 pages.
Locatello, F., et al., "Challenging Common Assumptions in the Unsupervised Learning of Disentangled Representations", Proceedings of the 36th International Conference on Machine Learning, Jun. 9-15, 2019, 11 pages.
Siddharth, N., et al., "Learning Disentangled Representations with Semi-Supervised Deep Generative Models", 31st Conference on Neural Information Processing Systems (NIPS 2017), Dec. 4-9, 2017, 11 pages.
Radford, A., et al., "Unsupervised Representation Learning with Deep Convolutional Generative Adversarial Networks", Under review as a conference paper at ICLR 2016, https://arxiv.org/pdf/1511.06434.pdf, Submitted on Nov. 19, 2015 (v1), Last Revised Jan. 7, 2016 (v2), 16 pages.
NIST, "NIST Cloud Computing Program", http://csrc.nist.gov/groups/SNS/cloud-computing/index.html, Created Dec. 1, 2016, Updated Oct. 6, 2017, 9 pages.

\* cited by examiner

SIMULATOR-ASSISTED TRAINING FOR INTERPRETABLE GENERATIVE MODELS

BACKGROUND

The present application relates generally to computers and computer applications, and more particularly to machine learning.

Simulation as a scientific tool allows for simulations of complex atomic reactions, protein folding and photo-realistic computer graphics. Simulators can represent human knowledge in a well-defined symbolic form, crystallizing information into models that can generate output data based on particular input specifications. Much of the progress in understanding the world's various phenomena relies on developing simulators, often using several of them in concert to describe larger interconnected systems.

BRIEF SUMMARY

A computer-implemented method and system of improving an operation of a variational autoencoder can be provided. The method, in one aspect, can include training a generator network of a variational autoencoder to approximate a simulator and generate a first result, the simulator associated with input data and output data, wherein a training data set for the generator network includes the simulator's input data and output data. The method can also include, based on the simulator's output data and the first result of the generator network, training an inference network of the variational autoencoder to generate a second result, the second result of the trained inference network inverting the first result of the generator and approximating the simulator's input data, the trained inference network functioning as an inverted simulator.

A system for improving an operation of a variational autoencoder, in one aspect, can include a hardware processor. A memory device can be coupled with the hardware processor. The hardware processor can be configured train a generator network of a variational autoencoder to approximate a simulator and generate a first result, the simulator associated with input data and output data, wherein a training data set for the generator network includes the simulator's input data and output data. The hardware processor can also be configured to, based on the simulator's output data and the first result of the generator network, train an inference network of the variational autoencoder to generate a second result, the second result of the trained inference network inverting the first result of the generator and approximating the simulator's input data, the trained inference network functioning as an inverted simulator.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Systems and methods are disclosed, which can distill a symbolic mapping modeled by a simulator into a neural network resulting in a deep neural network model, which approximates both the simulator and its inverse.

In an aspect, a model that can allow inference in both the forward and inverse directions of the simulator, in contrast to traditional numerical simulators which are difficult if not impossible to invert, can be beneficial. Simulators can in general be quite complex, computationally inefficient and discontinuous. An efficient heuristic, smooth version of a simulator that is invertible, can be valuable for applications in downstream reasoning tasks (e.g., by finding the parameters of a physical phenomenon from observing the data), or in technical fields such as circuit design, protein folding, and materials design, among others. Such a simplified simulator can also be used as a guide for further detailed inquiry into specific parameter spaces of interest that could take place back in the original, more accurate simulation domain.

Generally, classification systems can learn a map between data points and labels, but there is no continuity in the output space, and these systems often cannot generalize well to new types of examples. Generative models understand their domain well enough to create new examples, possess smooth mappings over the input-output space, and can operate probabilistically. However, the latent space typically does not correspond to any human understandable set of parameters; therefore, it is difficult to generate output data with a specified set of features. If a larger system needs to take input from multiple domains, all component parts must be trained together end-to-end, since there is no interpretable and standard interface between components that would allow different units to be swapped out or combined in different configurations.

In an embodiment, a simulator-assisted training method is presented for variational autoencoders that leads to a disentangled and interpretable latent space. The simulator-assisted training in an embodiment includes a two step process in which first a deep generator network (decoder) is trained to approximate a simulator. The simulator can be any chosen simulator. During this step the simulator acts as the data source or as a teacher network. Then an inference network (encoder) is trained to invert the decoder. As such, upon complete training, the encoder represents an approximately inverted simulator. In an aspect, the simulator-assisted training method can be general and can apply to simulators from a plethora of domains, and can learn disentangled representations. For example, the simulator-assisted training method can apply to simulators from very different domains such as, but not limited to, computer graphics, circuit design and mathematics. In an embodiment, the simulator-assisted training method need not rely on any assumptions regarding the input or output distributions of the simulator. For instance, the simulator-assisted training method need not rely on the latent (input) variables to be independent. In addition, the simulator-assisted training method can decouple the training of the encoder and decoder, and thus can bypass some of the difficulties that arise in training generative models such as variational autoencoders (VAEs) and generative adversarial networks (GANs).

In an embodiment, a method for training a variational autoencoder model of a simulator can result in both a generator that represents a simplified, probabilistic version of the simulator, and an encoder that is a corresponding probabilistic inverse of the simulator. Though simulators can in general be quite complex and may be discontinuous, a heuristic, smooth version that is invertible can be valuable for applications in downstream reasoning tasks, or in technical fields such as circuit design, protein folding, and materials design, among others. Such a simplified simulator can also be used as a guide for further detailed inquiry into specific parameter spaces of interest that could take place back in the original, more accurate simulation domain.

In an embodiment, the simulator-assisted variational autoencoder training method can naturally restrict the latent space to be both interpretable and disentangled. In an embodiment, orthogonality is not required; For example, the natural and interpretable parameters of the simulator need not be orthogonal (e.g., latent variables need not be correlated). In this case, the variational autoencoder model's latent space matches the simulator input space rather than artificially constraining its parameters to be orthogonal at the cost of reducing accuracy. In an embodiment, the variational autoencoder model can be trained in a semi-supervised manner using an explicit simulator, which results in a differentiable, probabilistic model and inverse model of the simulator. In another embodiment, the variational autoencoder model can be trained fully unsupervised by taking the inputs from, for example, a GAN or InfoGAN. A lack of orthogonality also does not necessarily imply that latent space is not interpretable.

Variational autoencoders (VAEs) and generative adversarial networks (GANs) are methods for learning deep generative models. Both methods can be unsupervised and may only need samples $\{x_i\}_{i=1}^M$ from the data distribution $p_x$ to learn a parametric model $G_\phi$ (generator) whose distribution $q_\phi$ matches that of the true data $p_x$. The distributions are matched using discrepancy measures such as f-divergences or integral probability metrics. In VAEs, $p_x$ represents a probabilistic function that maps sets of samples from the prior distribution $p_z$ over the latent space $\mathbb{R}^K$ to sets of samples in the observation space $\mathbb{R}^N$. In doing so, it additionally includes an encoding function (encoder) or an inference network $E_\theta$ to parameterize the variational posterior $p_\theta(z|x)$, which is trained to approximately invert the mapping of $G_\phi$. VAEs make an assumption about the distribution of the data, which yields a likelihood function. As such they can be trained using stochastic gradient based variational inference. The VAE training objective can be a lower bound to the log-likelihood, also referred to as the ELBO:

$$\int_x p_x(x) \log q_\phi(x) dx \geq \tag{1}$$
$$p_x(x) \left[ \int_z p_\theta(z|x) \log \frac{p_z}{p_\theta(z|x)} dz + \int_z p_\theta(z|x) \log q_\phi(z|x) dz \right] dx.$$

This ELBO has a unique form, the first term is a negative Kullback-Leibler (KL) divergence between the variational posterior and the model prior over the latent space. The second term promotes the likelihood of the observed data under the assumed model $\phi$ but it is not always tractable unlike the first term and is usually estimated using Monte Carlo (MC) estimators. But MC estimator based training increases the variance of the gradients. This increase in variance is controlled using the "re-parameterization trick" which, in effect, removes the MC sampler from the computation graph. For example, using this "re-parameterization trick" $u \sim \mathcal{N}(\mu, \sigma)$ can be expressed as $u = \mu + \sigma * \epsilon$, where $\epsilon \sim \mathcal{N}(0,1)$. This gives the final ELBO:

$$\mathbb{E}_{p_x} \log q_\phi(x) \geq \mathbb{E}_{p_x}[-KL[p_\theta(z|x) \| p_z] + \mathbb{E}_{\mathcal{N}(0,1)}[\log q_\phi(x|\mu_\theta(x) + \sigma_\theta(x)*\epsilon)]]. \tag{2}$$

Here $\mu_\theta$ and $\sigma_\theta$ are posterior parameters that the encoder function $E_\theta$ outputs.

Figure 1:
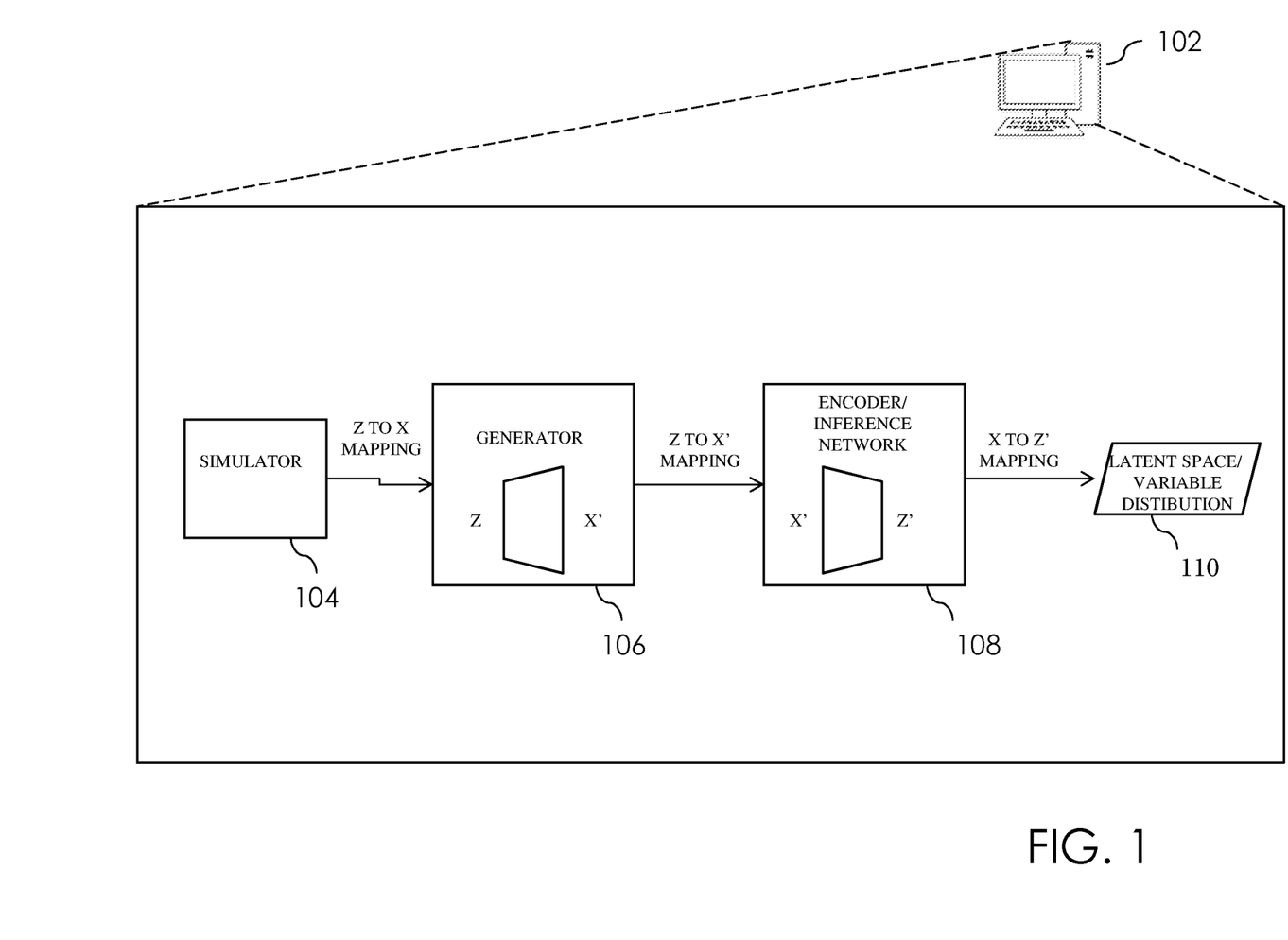
FIG. 1 is a diagram illustrating components of a variational autoencoder (VAE) training system in an embodiment.

FIG. 1 is a diagram illustrating components of a simulator-assisted VAE training system in one embodiment. The components shown include computer-implemented components, for instance, implemented and/or run on one or more processors 102 or hardware processors, or coupled with one or more hardware processors. By way of example, one or more processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. A processor may be a central processing unit (CPU), a graphics processing unit (GPU), a field programmable gate array (FPGA), an application specific integrated circuit (ASIC), another suitable processing component or device, or one or more combinations thereof. The memory device may include random access memory (RAM), read-only memory (ROM) or another memory device, and may store data and/or processor instructions for implementing various functionalities associated with the methods and/or systems described herein. The processor 102 may execute computer instructions stored in the memory or received from another computer device or medium.

In an embodiment, the two-step, simulator-assisted training of VAE can define a simulator 104, the simulator S: $\mathbb{R}^K \mapsto \mathbb{R}^N$ as a deterministic black-box function that maps each i-th point $z_i \in \mathbb{R}^K$ from its domain to a unique point $x_i \in \mathbb{R}^N$ in its range. Usually, N>>K for most physical simulators. In the first step, simulator-assisted training of VAE trains a generator 106, $G_\phi$: $\mathbb{R}^K \mapsto \mathbb{R}^N$, a Borel measurable function, to learn a probabilistic map of the simulator S. To achieve this, in an embodiment, simulator-assisted training of VAE can define Z(z), in the latent space, and X(x), in the output space, as K and N dimensional random variables. To learn the function S 104 faithfully, in an embodiment, $G_\phi$ is parameterized with a deep neural network. The training can be achieved by minimizing a suitable measure of discrepancy D (depending on the output space of S) on the observations from the two functions on the same input with respect to φ, as shown below:

$$\min_\phi \mathcal{L}_D(\phi) = \min_\phi \Sigma_i D[S(z_i), G_\phi(z_i)]. \quad (3)$$

In an embodiment, since the domain of S is infinite in practice, the optimization problem can be solved using mini-batches in a stochastic gradient descent first order optimization method such as Adaptive Moment Estimation (Adam).

Upon successful training of the generator, $G_\phi \approx S$, the next step in the simulator-assisted training of VAE in an embodiment can be to train an inference network 108 (encoder, $E_\theta$: $\mathbb{R}^D \mapsto \mathbb{R}^K$) to invert the generator 106, which in turn, if successfully trained, provides an approximate inversion of the simulator 104 and as a result a disentangled and interpretable representation of the latent space 110. In an embodiment, the simulator-assisted training of VAE can do that via the following objective:

$$\min_\theta \mathcal{L}_\epsilon(\theta) = \min_\theta \Sigma_i D[S(z_i), G_\phi(\mu_{E_\theta}(S(z_i)) + \epsilon^* \sigma_{E_\theta}(S(z_i)))]. \quad (4)$$

Here, $\mu_{E_\theta}$ and $\sigma_{E_\theta}$ are the posterior parameters that the encoder 108 outputs and is a sample from a standard Gaussian. In an embodiment, training the encoder 108 does not involve any supervision. Computation is only done on $S(z_i)$, a sample in data space, while the latent variables $z_i$ are hidden. In an embodiment, the training of the generator and the training of the encoder or inference network can be separated. For example, in training the encoder, inference is run on the generator, but the weights of the generator can be frozen.

In an aspect, while the simulator 104 is typically black-box and non-differentiable, the generator is a neural network which the simulator-assisted training of VAE can control and therefore the simulator-assisted training of VAE can back-propagate through the network and the latent variables to train the encoder. While an embodiment of the simulator-assisted training of VAE can use the "re-parameterization trick" here, in general the simulator-assisted training of VAE does not require it. If it is not used, in the cases where S is a one-to-many map, the encoder may only learn one such mapping.

In an embodiment, the simulator-assisted training of VAE inverts the generator 106, and can work with a complex multi-task learning problem, where some of the output parameters may be correlated. Further, the simulator-assisted training of VAE, which inverts the generator 106, can work with a simulator in which the inverse of the simulator is a one-to-many relation (e.g., the RLC circuit (an electrical circuit having a resistor (R), an inductor (L), and a capacitor (C)) or polygon example simulators), which turns the problem into a multi-label learning problem. In addition, discrepancies in the observable space, which are the basis for loss functions used to train generative models such as VAE, allow reconstruction of the data distribution and are more natural for humans learning.

Figure 2:
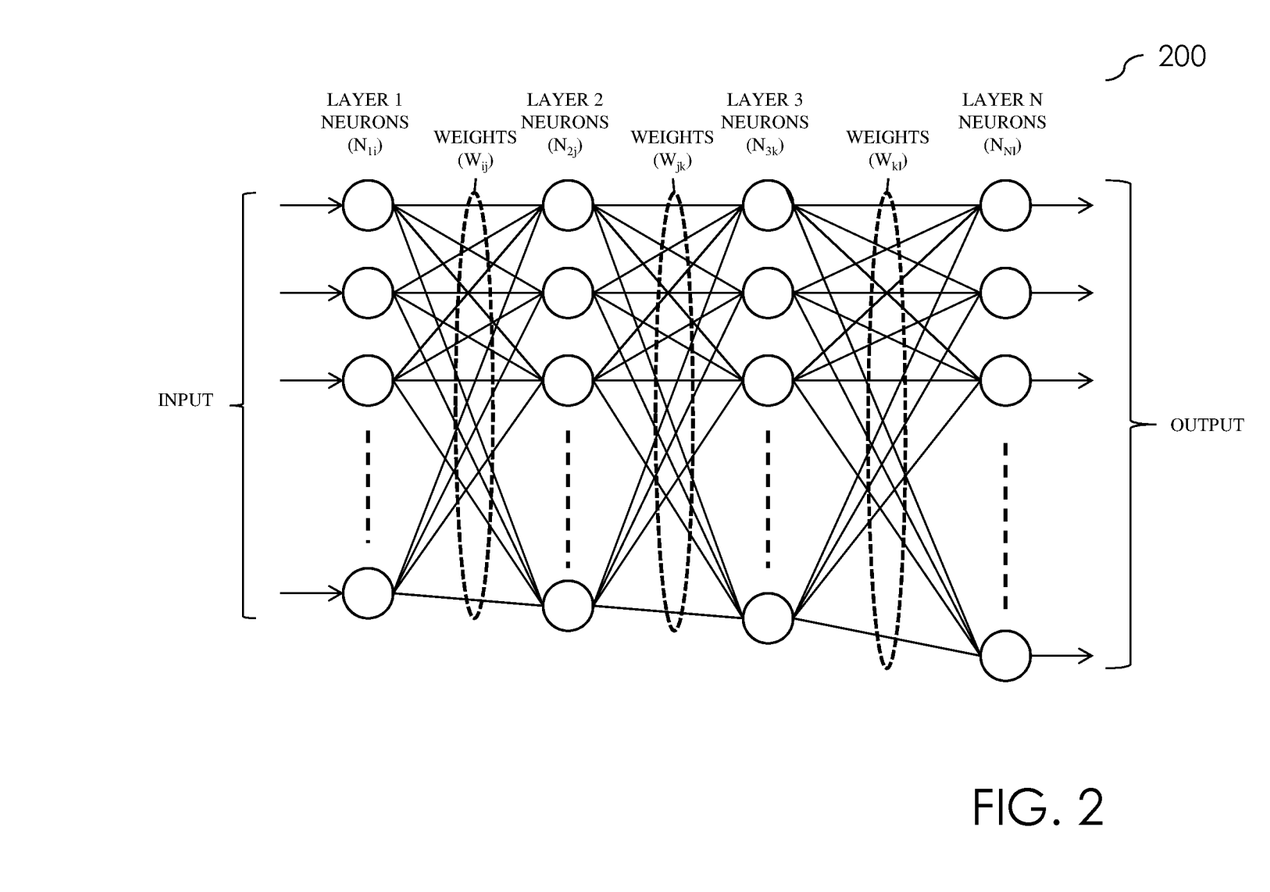
FIG. 2 illustrates an example deep neural network in an embodiment.

In an embodiment, the generator 106 can be implemented as a deep neural network. Similarly, the encoder 108 can be implemented by as a deep neural network. A deep neural network is an artificial neural network. FIG. 2 illustrates an example deep neural network 200 in an embodiment. An embodiment of an implementation of an artificial neural network can include a succession of layers of neurons, which are interconnected so that output signals of neurons in one layer are weighted and transmitted to neurons in the next layer. A neuron Ni in a given layer may be connected to one or more neurons Nj in the next layer, and different weights wij can be associated with each neuron-neuron connection Ni-Nj for weighting signals transmitted from Ni to Nj. A neuron Nj generates output signals dependent on its accumulated inputs, and weighted signals can be propagated over successive layers of the network from an input to an output neuron layer. An artificial neural network machine learning model can undergo a training phase in which the sets of weights associated with respective neuron layers are determined. The network is exposed to a set of training data, in an iterative training scheme in which the weights are repeatedly updated as the network "learns" from the training data. The resulting trained model, with weights defined via the training operation, can be applied to perform a task based on new data. For example, a generator (e.g., shown in FIG. 1 at 106) can be trained based on the input and output data of a simulator (e.g., shown in FIG. 1 at 104). The trained generator can predict or output observed data based on input latent variable.

In embodiments, the simulator-assisted training of VAE can be general and can apply to simulators from a plethora of domains. In an embodiment, the simulator-assisted training of VAE does not make any assumptions on the prior or posterior distributions, and avoids some of the difficulties in jointly training competing (as in GANs) or complementing (as in VAE) models.

The simulator-assisted training of VAE can be performed on a variety of simulators, for example, both image-based and purely symbolic. The training experiments performed on such a variety of simulators show the generality of this training method. In an embodiment, by way of example, the ADAM optimizer can be implemented or used for training, for example, with the learning rate set to 0:001 and the other parameters set to their default values in the Tensorflow framework. By way of examples, image-based models can be trained using the Deep Convolutional Generative Adversarial Network (DCGAN) architecture and the RLC circuit simulator model can be trained using a simple feed-forward architecture. In an embodiment, the architecture of the VAE model can be interchangeable depending on the desired task, e.g., a recurrent neural network (RNN) may be used for circuit simulation to capture larger signal spaces, or an autoregressive decoder may be used for image generation tasks to enhance reproduction accuracy.

Comparisons of the output from the model vs. the ground truth simulations can be shown, for example, in determining the degree of the model's accuracy. Representative samples of model output from varying one latent variable while holding the others fixed can be also shown.

Examples of VAE models trained based on example simulators are described below. By way of example, the simulators based on which the VAE models are trained can include a box plotter, polygon plotter, dSprites data set which contain images of 2-dimensional (2D) shapes, which data can be used to assess the disentanglement properties of unsupervised learning methods, Fourier transform and RLC circuit. The training method may also apply to more complex simulators such as photo-realistic graphics engines.

Example Trained Models

Box plotter. A model can be trained on a graphical simulator that plots a black rectangle with a blue 'x' in the center. Input parameters can be the (x, y) coordinates of the lower left corner of the rectangle, and the width w and height h of the rectangle. In this example, the sample space that the model is trained on is constrained for the rectangle to remain always within the defined pixel region, e.g., 64×64 pixel field of view, by constraining the initial (x; y) coordinates based on the randomly sampled w and h. This intentionally creates correlations in the ground truth simulator latent variables, which is replicated in the model latent space for optimum accuracy and interpretability.

Polygon plotter. This method generalizes straightforwardly to rendering and de-rendering an arbitrary four-pointed polygon. The polygon is not restricted to be non-intersecting, and therefore generates folded shapes which the model is also required to learn. The model can choose multiple permutations of the four points of the polygon to generate the same output shape, so the inverse simulator is a one-to-many map.

dSprites. A VAE model can also be trained on the dSprites disentanglement dataset, which includes 737,280 binary 2D shapes constructed from five independent generative parameters (shape, size, rotation, x-position, and y-position). Since the dataset is complete, including all examples of images from the five parameters, the dataset itself can be treated as a black box simulator and invert it using the method described above.

Fourier transform. To demonstrate the advantages of an inverse simulator that operates probabilistically, a model can be trained based on a simulator which takes as input a set of Fourier coefficients, and outputs a plot of the inverse Fourier transform based on those coefficients. For example, hand-drawn images of arbitrary curves, may be given to the model to reconstruct based on the Fourier coefficients generated by the encoder. In an embodiment, this method can generalize to calculate the most likely result even given input that is outside the domain of the original function (a hand-drawn image vs. a vector of data or a plot in the original format generated by the simulator).

RLC circuit. Using a circuit simulator package, the series RLC circuit can be simulated, with the simulator input being the resistance R, inductance L, and capacitance C, and the output being the gain and phase versus (vs.) frequency. The inverse RLC simulator is also a one-to-many map, as the gain and phase are invariant with respect to a transformation of the form $$R \mapsto \frac{R}{x}, L \mapsto \frac{L}{x},$$

$C \mapsto Cx$, where x is any scaling factor. The relevant physical parameters are the resonant frequency $f_0 = 1/(2\pi\sqrt{LC})$ and quality factor $Q = (1/R)\sqrt{L/C}$.

In an aspect, a simulator such as an image-based simulator can have input Z and output X. For instance, given input Z, a simulator produces output X. A generator is trained to output $\bar{X}$ on the same input Z. An encoder can be trained to output $\bar{Z}$ on the simulator output X. The simulator can output X given encoder generated output $\bar{Z}$. The generator can output $\bar{X}$ on encoder output $\bar{Z}$.

Figure 3:
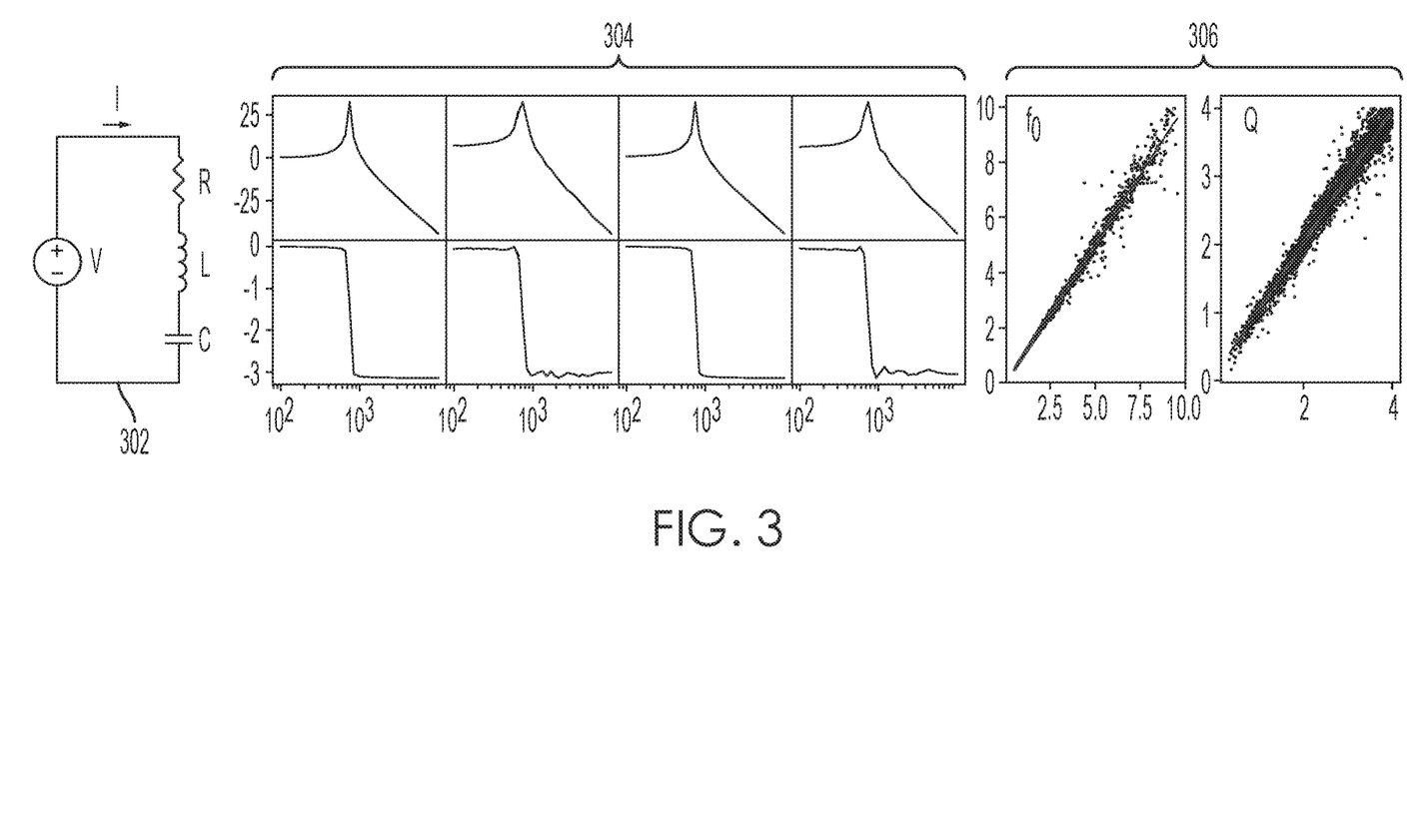
FIG. 3 shows example output of an example VAE model which models a series RLC circuit according to an embodiment.

Similarly, an RLC model can be built based on an RLC circuit simulator. FIG. 3 shows output of an RLC model which models a series RLC circuit, a schematic of which is shown at 302. 304 shows comparison of decoder-generated and simulator-generated output gain in dB (top) and phase in radians (bottom). From left to right, the plots show simulator output X on input Z, generator output $\bar{X}$ on the same input Z, the simulator output X on encoder output $\bar{Z}$, and the generator output $\bar{X}$ on encoder output $\bar{Z}$. 306 shows correlation between $f_0$ (kHz) and Q calculated from Z vs. from V, with calculated slopes of 1.00 and 0.97, and $R^2$ of 0.99 and 0.97 respectively. Data shown is limited to the range of validity of the model, $f_0 < 10$ kHz and $Q < 4$.

An approach for simulator-based training of variational autoencoders can be general and may work with any simulator. An aspect of the approach is to separate the training to two stages: a supervised stage where a generative model approximating the simulator is learned, and an unsupervised stage where an inference model approximating the inverse of the simulator is learned. A supervised training using a simulator can constrain the identities of the latent variables, for example, impose identities on some or all of the latent variables. While generative models are typically associated with unsupervised learning while inference (discriminative) models are associated with supervision, the approach in an embodiment that the opposite can yield powerful models.

When considering the world as a complex simulator, the decoupled semi-supervised approach suggests interesting directions to explore in the context of machines vs. humans learning. In an embodiment, a VAE model can be initialized in an unsupervised manner using a VAE or GAN approach (although this stage is not needed), followed by a supervised stage of training the generator and then an unsupervised stage of training the encoder. Moving forward, both models can be continuously trained depending on the data that the system receives: when the observed data is coupled with labels (namely, values of latent variables) the supervised generator training kicks in, and when it is not, the unsupervised encoder training kicks in. The method can alternate between supervised and unsupervised learning of approximate simulation and its inverse respectively.

In an aspect, compositionality and causality can be explored. The approach, for example, can learn exactly the latent variables of interest for downstream applications. For example consider the problem of learning to multiply hand written numbers. One can first learn models that generate and recognize hand written digits by approximating a digits graphics engine. Then given a multiplication simulator, one can learn models that multiply and factor hand written numbers up to 81 (9×9) and use the digits generator to generate the 'hand written' result. In order to learn in general how to multiply multi-digit numbers, causality is an aspect. Namely, fine grained simulators of the components of the multiplication algorithm can be learned. In an aspect, a metric may be identified to quantify disentanglement and interpretability that can distinguish between representation accuracy and disentanglement, and which can be effective in the case of many-to-one and one-to-many mappings.

Figure 4:
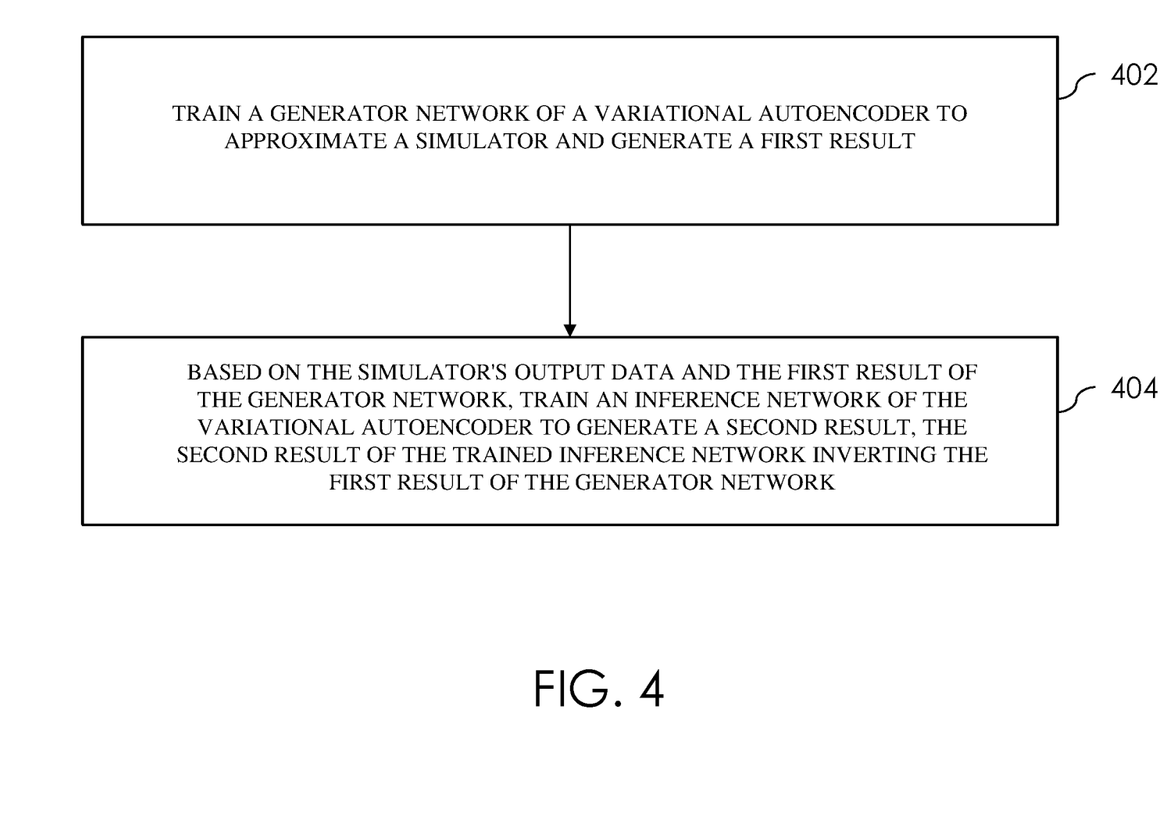
FIG. 4 is a flow diagram illustrating a method of simulator-assisted training of a VAE in an embodiment.

FIG. 4 is a flow diagram illustrating a method of simulator-assisted training of a VAE in one embodiment. The method can improve an operation of a variational autoencoder. The method can be performed or executed by one or more processors. At 402, the method may include training a generator network of a variational autoencoder to approximate a simulator and generate a first result. The simulator is associated with input data and output data. For example, given the input data, the simulator produces or outputs the output data. A training data set for the generator network includes the simulator's input data and output data. The generator network is trained to produce output data of the simulator, also referred to as a first result, given an input data. In an embodiment, a supervised training technique trains the generator network.

In an embodiment, training of the generator network includes minimizing a measure of discrepancy D on observations from the simulator and the generator network on the same input data. In an embodiment, the generator network can be an artificial neural network.

The simulator's input data, based on which the generator network is trained, includes a representation of latent space of the variational autoencoder. The latent space is disentangled and interpretable.

At 404, based on the simulator's output data and the first result of the generator network, training an inference network of the variational autoencoder to generate a second result, the second result of the trained inference network inverting the first result of the generator and approximating the simulator's input data, the trained inference network functioning as an inverted simulator. In an embodiment, an unsupervised training technique trains the inference network.

In an embodiment, training the inference network includes minimizing a measure of discrepancy D on observations from the simulator on the input data and from the generator network on posterior parameters that the inference network outputs, which is a sample from a standard Gaussian, and latent variables of the simulator's observation are hidden. In an embodiment, the inference network is an artificial neural network.

Figure 5:
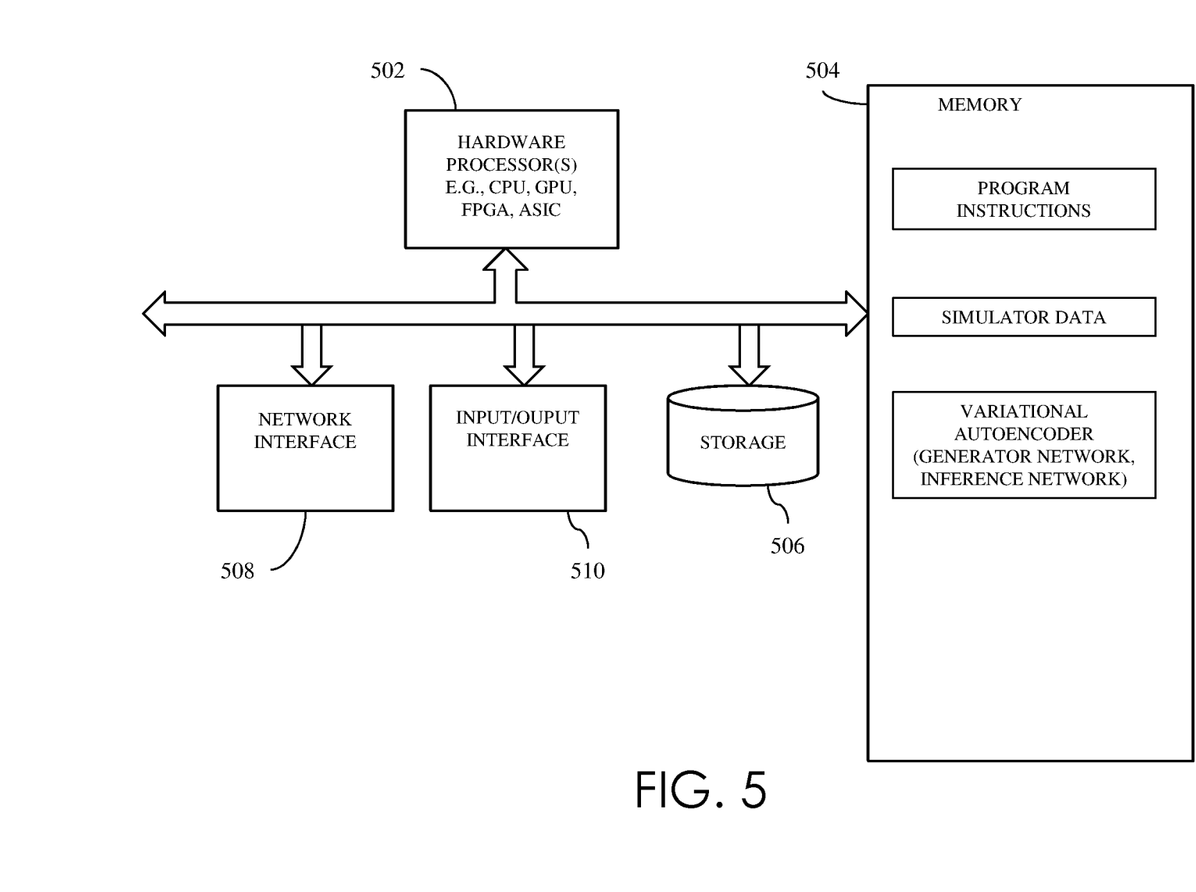
FIG. 5 is a diagram showing components of a system in one embodiment, which can improve an operation of a VAE.

FIG. 5 is a diagram showing components of a system in one embodiment, which can improve an operation of a variational autoencoder. One or more hardware processors 502 such as a central processing unit (CPU), a graphic process unit (GPU), and/or a Field Programmable Gate Array (FPGA), an application specific integrated circuit (ASIC), and/or another processor, may be coupled with a memory device 504, and train a generator network and inference network of the variational autoencoder. A memory device 504 may include random access memory (RAM), read-only memory (ROM) or another memory device, and may store data and/or processor instructions for implementing various functionalities associated with the methods and/or systems described herein. One or more processors 502 may execute computer instructions stored in memory 504 or received from another computer device or medium. A memory device 504 may, for example, store instructions and/or data for functioning of one or more hardware processors 502, and may include an operating system and other program of instructions and/or data. One or more hardware processors 502 may receive simulator data and train the generator network to approximate a simulator. One or more hardware processors 502 may also train the inference network based on simulator output data and the data sampled from the generator network's output. In an embodiment, simulator data may be stored in a storage device 506 or received via a network interface 508 from a remote device, and may be temporarily loaded into a memory device 504 for building or generating the variational autoencoder model. The learned variational autoencoder model may be stored on a memory device 504, for example, for execution by one or more hardware processors 502. One or more hardware processors 502 may be coupled with interface devices such as a network interface 508 for communicating with remote systems, for example, via a network, and an input/output interface 510 for communicating with input and/or output devices such as a keyboard, mouse, display, and/or others.

Figure 6:
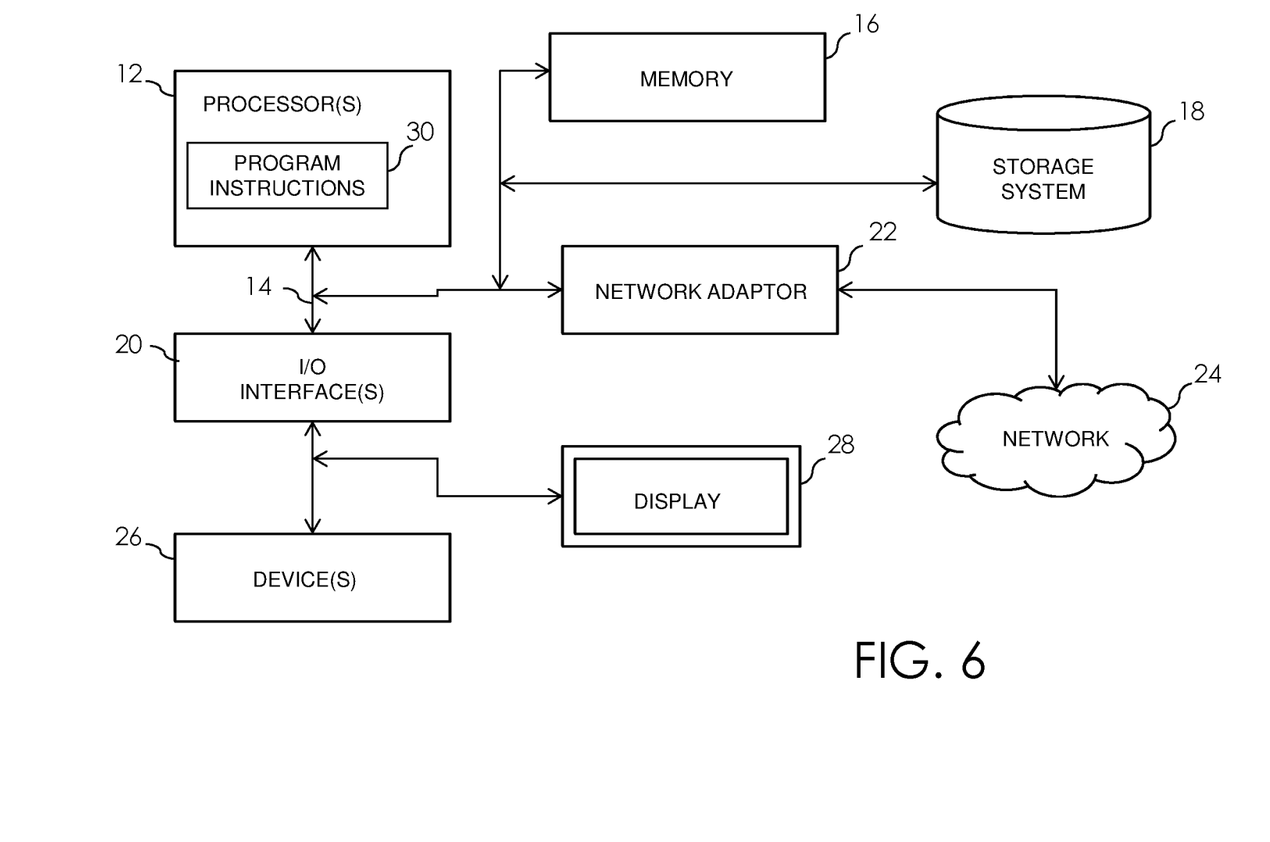
FIG. 6 illustrates a schematic of an example computer or processing system that may implement a VAE modeling system in one embodiment.

FIG. 6 illustrates a schematic of an example computer or processing system that may implement a variational autoencoder modeling or training system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
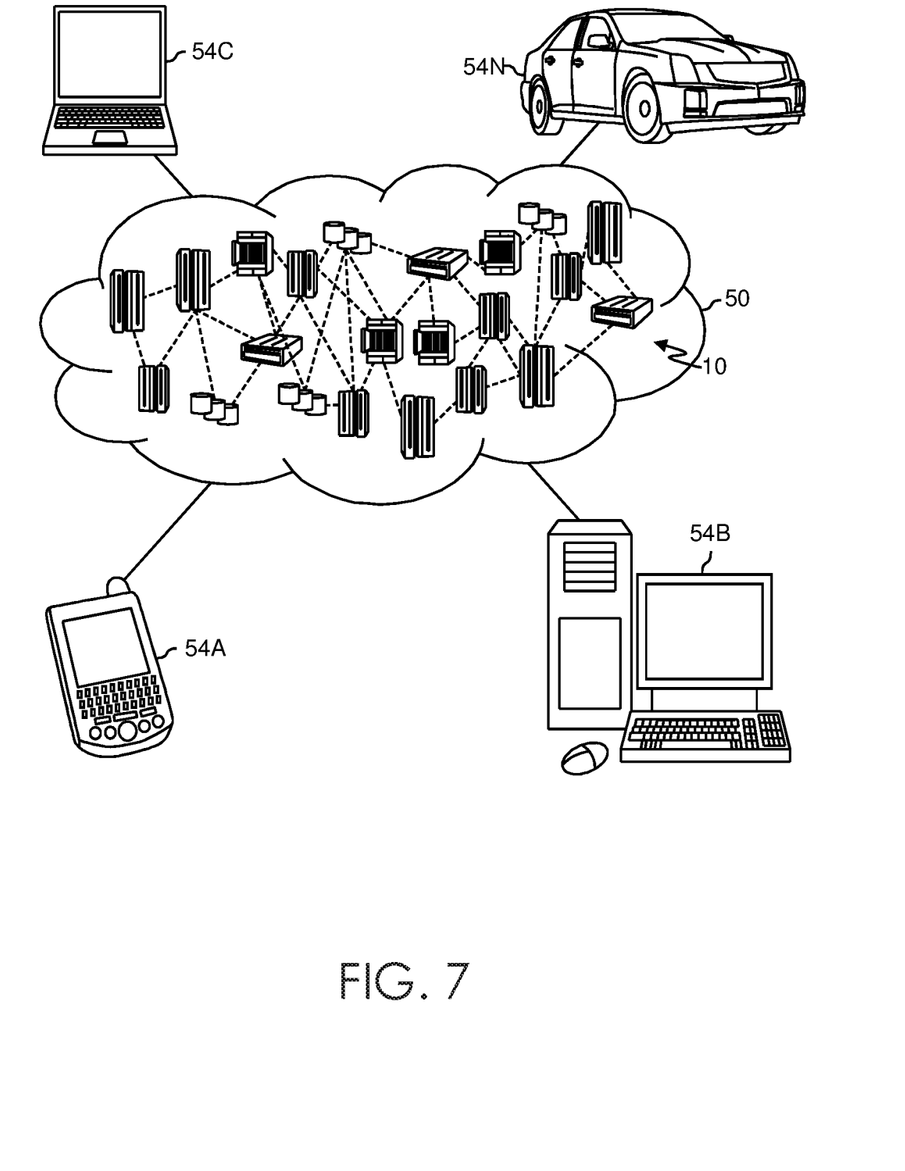
FIG. 7 illustrates a cloud computing environment in one embodiment.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
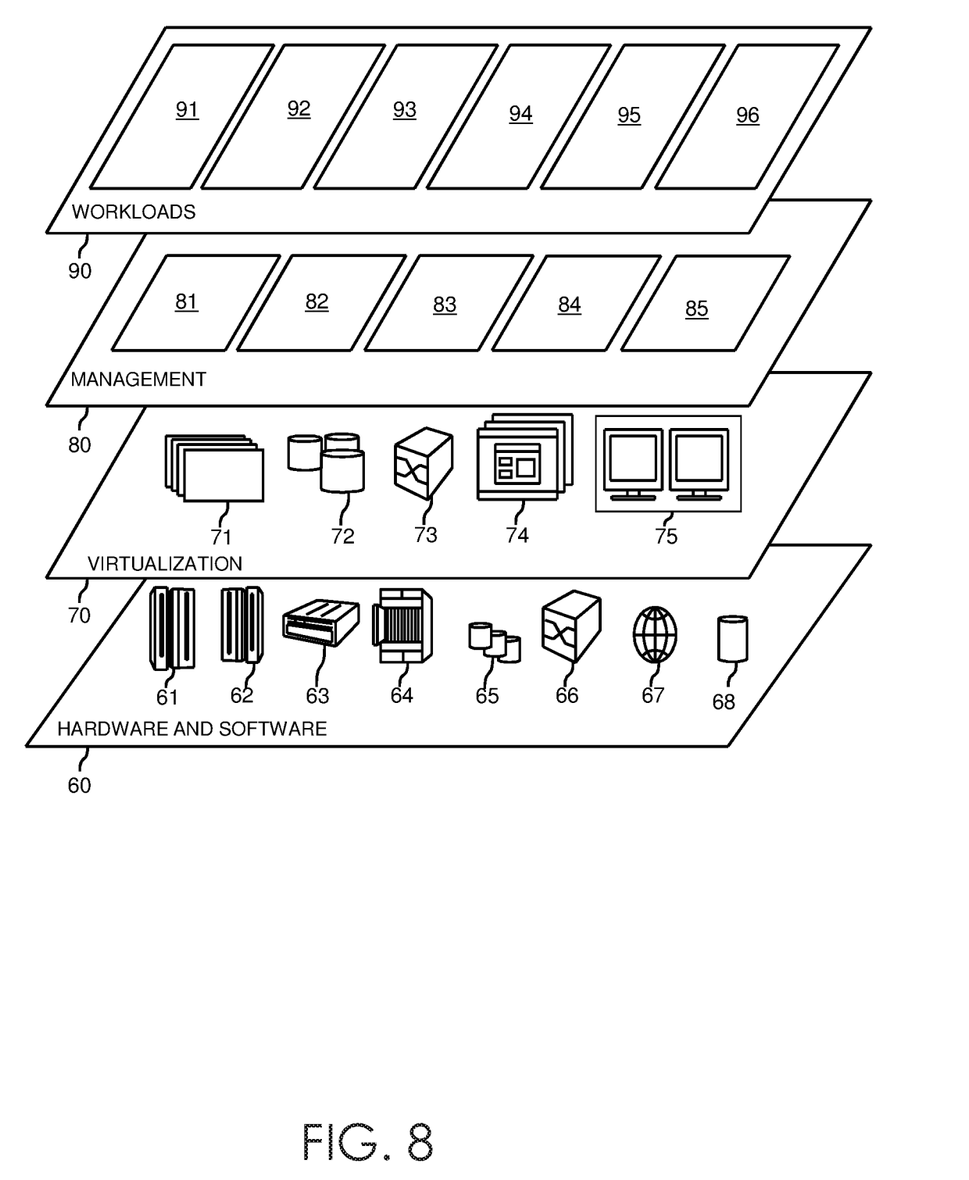
FIG. 8 illustrates a set of functional abstraction layers provided by cloud computing environment in one embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and variational autoencoder processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of improving an operation of a variational autoencoder, comprising: training a generator network of a variational autoencoder to approximate a simulator and generate a first result, wherein the simulator having been run prior to the training the generator network, given input data, outputs output data that simulates output of an entity the simulator is simulating, the first result generated by the generator network being an approximation of the simulator's output data, wherein a training data set for the generator network includes the simulator's input data and output data, wherein the generator network receives the simulator's input data as generator network's input and the generator network learns to approximate the simulator's output data based on being trained on the training data set, wherein the variational autoencoder's latent space matches an input space of the simulator; based on the simulator's output data and the first result of the generator network, training an inference network of the variational autoencoder to generate a second result, the second result approximating the simulator's input data, the second result of the trained inference network inverting the first result of the generator network, the trained inference network functioning as an inverted simulator, wherein the training of the generator network and the inference network of the variational autoencoder is decoupled.

2. The method of claim 1, wherein the second result comprises a representation of latent space of the variational autoencoder.

3. The method of claim 2, wherein the representation is disentangled and interpretable.

4. The method of claim 1, wherein the training the generator network includes supervised training.

5. The method of claim 1, wherein the training the inference network includes unsupervised training.

6. The method of claim 1, wherein the training the generator network includes minimizing a measure of discrepancy D on observations from the simulator and the generator network on the same input data.

7. The method of claim 1, wherein the training the inference network includes minimizing a measure of discrepancy D on observations from the simulator on the input data and from the generator network on posterior parameters that the inference network outputs, which is a sample from a standard Gaussian, and latent variables of the simulator's observation are hidden.

8. The method of claim 1, wherein the generator network is an artificial neural network.

9. The method of claim 1, wherein the inference network is an artificial neural network.

10. A computer program product for improving an operation of a variational autoencoder, the computer program product comprising a computer readable storage medium having program instructions embodied therewith, the program instructions executable by a device to cause the device to: train a generator network of a variational autoencoder to approximate a simulator and generate a first result, wherein the simulator having been run prior to training the generator network, given input data, outputs output data that simulates output of an entity the simulator is simulating, the first result generated by the generator network being an approximation of the simulator's output data, wherein a training data set for the generator network includes the simulator's input data and output data, wherein the generator network receives the simulator's input data as generator network's input and the generator network learns to approximate the simulator's output data based on being trained on the training data set, wherein the variational autoencoder's latent space matches the an input space of the simulator; based on the simulator's output data and the first result of the generator network, train an inference network of the variational autoencoder to generate a second result, the second result approximating the simulator's input data, the second result of the trained inference network inverting the first result of the generator network, the trained inference network functioning as an inverted simulator, wherein the training of the generator network and the inference network of the variational autoencoder is decoupled.

11. The computer program product of claim 10, wherein the second result comprises a representation of latent space of the variational autoencoder.

12. The computer program product of claim 11, wherein the representation is disentangled and interpretable.

13. The computer program product of claim 10, wherein the device is caused to train the generator network by supervised training.

14. The computer program product of claim 10, wherein the device is caused to train the inference network by unsupervised training.

15. The computer program product of claim 10, wherein the device is caused to train the generator network by minimizing a measure of discrepancy D on observations from the simulator and the generator network on the same input data.

16. The computer program product of claim 10, wherein the device is caused to train the inference network by minimizing a measure of discrepancy D on observations from the simulator on the input data and from the generator network on posterior parameters that the inference network outputs, which is a sample from a standard Gaussian, and latent variables of the simulator's observation are hidden.

17. The computer program product of claim 10, wherein the generator network is an artificial neural network.

18. The computer program product of claim 10, wherein the inference network is an artificial neural network.

19. A system for improving an operation of a variational autoencoder, comprising: a hardware processor; a memory device coupled with the hardware processor; the hardware processor configured to at least: train a generator network of a variational autoencoder to approximate a simulator and generate a first result, wherein the simulator having been run prior to training the generator network, given input data, outputs output data that simulates output of an entity the simulator is simulating, the first result generated by the generator network being an approximation of the simulator's output data, wherein a training data set for the generator network includes the simulator's input data and output data, wherein the generator network receives the simulator's input data as generator network's input and the generator network learns to approximate the simulator's output data based on being trained on the training data set, wherein the variational autoencoder's latent space matches an input space of the simulator; based on the simulator's output data and the first result of the generator network, train an inference network of the variational autoencoder to generate a second result, the second result approximating the simulator's input data, the second result of the trained inference network inverting the first result of the generator network, the trained inference network functioning as an inverted simulator, wherein the training of the generator network and the inference network of the variational autoencoder is decoupled.

20. The system of claim 19, wherein the second result includes a representation of latent space of the variational autoencoder.

* * * * *